Dec. 28, 1937.  E. H. GORTON  2,103,943
DRAWING BOOK
Filed Dec. 11, 1934  3 Sheets-Sheet 2

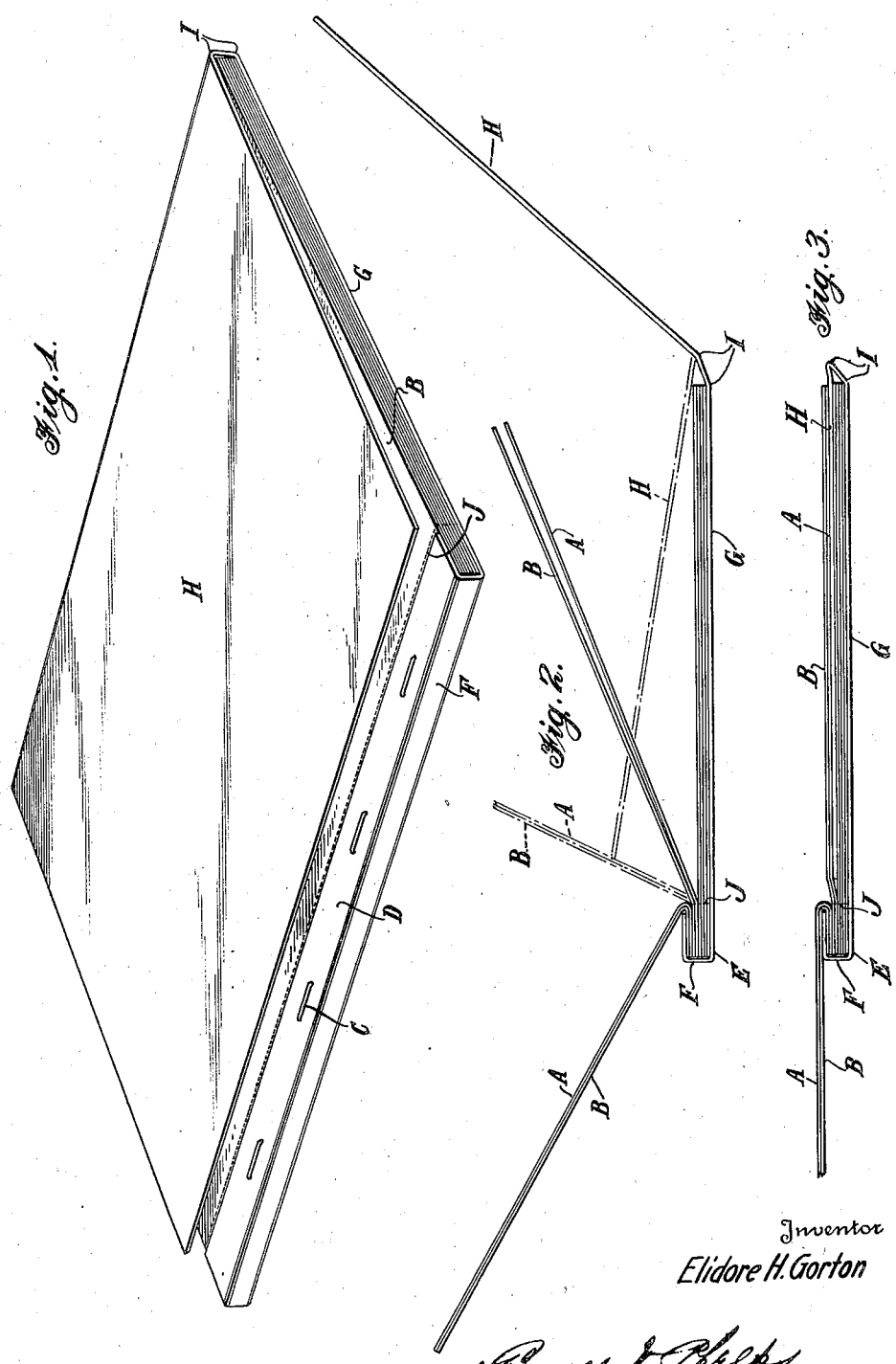

Inventor
Elidore H. Gorton
By
Attorneys

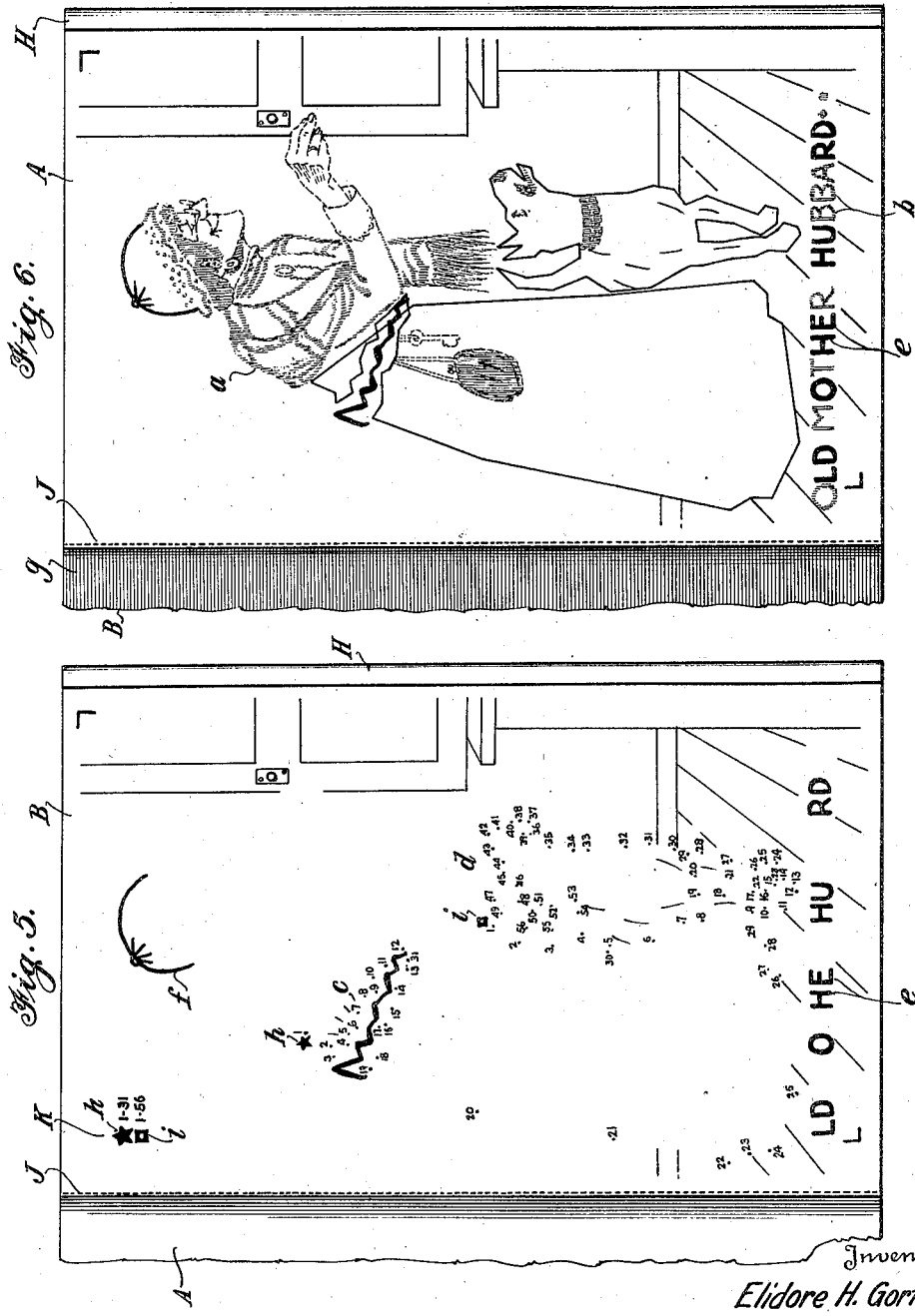

Patented Dec. 28, 1937

2,103,943

UNITED STATES PATENT OFFICE 2,103,943

DRAWING BOOK

Elidore H. Gorton, Baltimore, Md., assignor to The Baltimore Salesbook Company, Baltimore, Md., a corporation of Maryland Application December 11, 1934, Serial No. 757,050

11 Claims. (Cl. 35—26)

This invention relates to an educational drawing book or equivalent designed to afford creative pastime for entertainment, instruction and development of graphic talent especially for children.

One important desideratum is to provide such a device which enables the child to produce a picture or drawing, multi-colored if desired, which closely simulates a free hand sketch, and which contains no guide matter or other indicia such as lines and numbering.

Another aim is to provide an article of the general nature outlined wherein the subject or identity of the complete sketch, drawing or the like remains a mystery until substantially completed, thus adding to the interest and surprise of the child.

A further object is to provide a structure of the present character wherein various lines are adapted to be drawn from one dot or location to other dots or locations consecutively, and which are preferably numbered or otherwise consecutively identified; the sheet containing the dots or the like, in some instances having them arranged in a plurality of zones and also having a key indicia individual to each zone and grouped at another portion of the sheet.

It is further aimed to provide such a book or the like wherein the cover in a novel manner serves as a stop card.

Various additional objects and advantages will in part be pointed out and otherwise become apparent from a consideration of the description following, taken in connection with the accompanying drawings illustrating an operative embodiment.

In said drawings:

Figure 1 is a perspective view of the book constituting an embodiment of my invention, the same being substantially folded;

Fig. 2 is an end elevation of the book, certain of the leaves, and stop card being open, the positioning of the stop card beneath leaves of the book being suggested in dot-dash lines;

Fig. 3 is an end elevation of the book showing certain leaves open and the stop card in operative position for drawing use;

Fig. 5 is a fragmentary plan view showing the book open to a sheet adapted to be traced by the child, the stop sheet being in operative position; and Fig. 6 is a fragmentary plan view of the open book showing the sketch or drawing resulting from the coaction of the sheets shown in Figs. 4 and 5.

Figure 4:
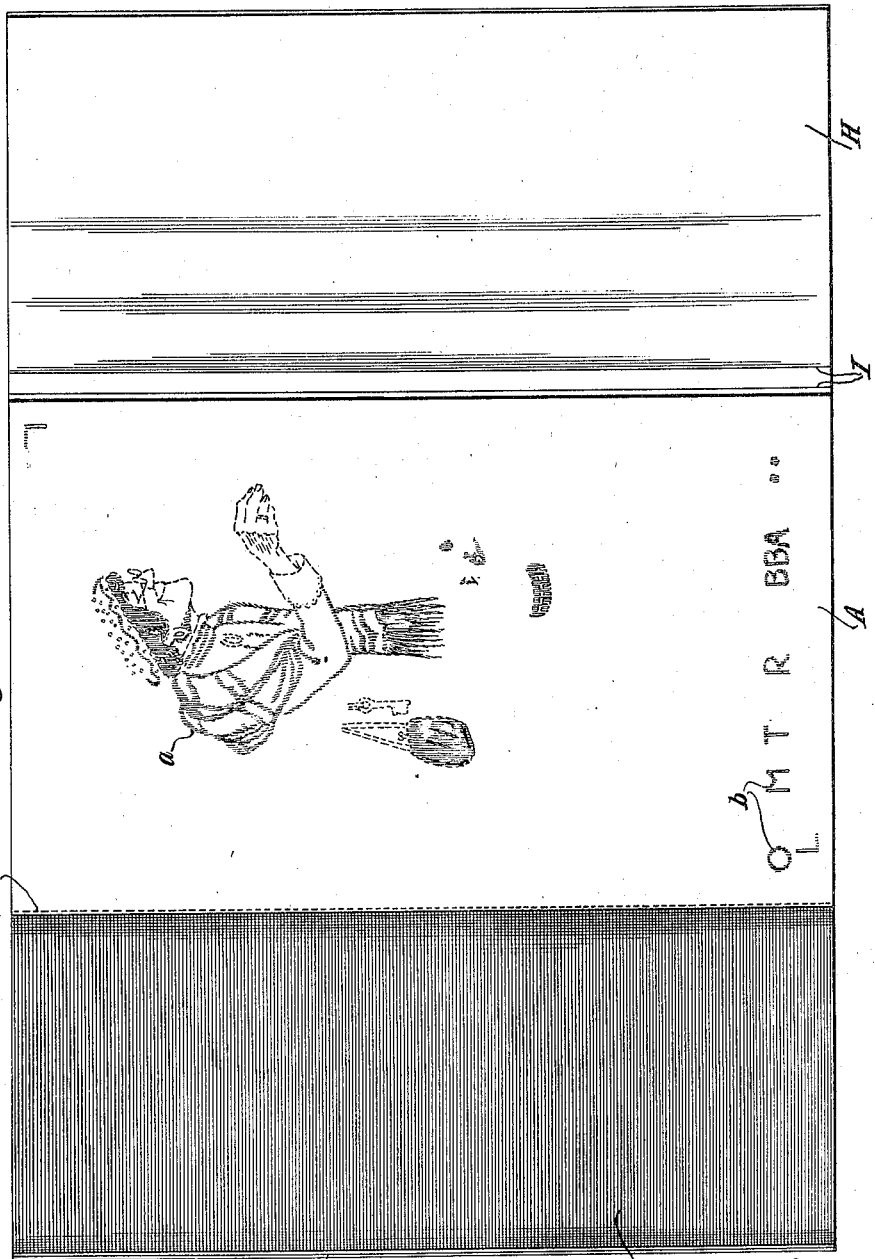
Fig. 4 is a plan view of the book partially open, particularly illustrating the sheet which constitutes the final drawing or sketch.

Referring specifically to the drawings wherein like reference characters designate like or similar parts, the present embodiment of the invention is in book form. To this end, alternate sheets A and B are piled and secured together along one longitudinal edge in any suitable manner as by means of staples C, which staples pass through a flap D constituting part of a cover E for the complete book. Such cover consists of a single sheet of cardboard or equivalent material and is completed by a binding edge portion F, a back G and a front or stop card H, the latter preferably being hinged or folded to the back G along a plurality of relatively close lines at I. Normally the front or stop card H is disposed over the sheets A and B in order to completely enclose and protect them.

Said sheets or leaves A and B may be of paper although no limitation in this connection is to be implied and each sheet is preferably scored or weakened as at J adjacent to the free edge of the flap D.

On the upper surfaces of the sheets A, a portion of a picture, sketch or graphic delineation is delineated as at $a$ and certain letters of the title may be delineated thereon as at $b$. The matter $a$ and $b$ are to represent as closely as possible, free hand sketching or drawing; for example, see Fig. 4.

Said sheets or leaves B, as shown in Fig. 5, at various locations contain dots which are shown, at one or more zones, as at $c$ and $d$, the dots in one zone, for instance, being numbered from 1 to 31 and the dots in the other zone being numbered from 1 to 56. These sheets or leaves B also contain numerals E to supplement those at B and further may contain lines as at F to be traced.

Suitable transfer material is provided between each leaf or sheet B and the leaf or sheet A therebeneath and preferably consists of a coating of carbon as at G on the under surface of each sheet or leaf B, although obviously separate sheets of carbon paper may be used if desired.

The child, by means of a pencil or other stylus is adapted to draw in straight lines from one of the dots to the other dots in the different zones, consecutively, as indicated and also to trace the matter at $e$ and $f$. As a result, a complete sketch, drawing or picture will be produced on the sheet A as shown in Fig. 6. Obviously the leaves or sheets A and B are secured together in proper registration.

To add interest, the final sketch, drawing or picture is preferably in two colors, inasmuch as the carbon coating at $g$ may be different in color from the matter initially delineated on the sheets A at $a$ and $b$. For instance, the delineated matter on sheet A may be red while all matter added thereto by the carbon coating may be blue.

When more than one zone $c$ and $d$ for instance are used, a group of keys is preferably provided adjacent one corner or otherwise of each sheet B as suggested at K and may comprise a star or asterisk $h$ and an open rectangular character at $i$.

Said character $h$ corresponds to the character designating the zone $c$ and the character corresponds to the character designating the zone $d$ as a whole.

During the tracing or drawing on the sheet B, the stop card H is inserted beneath the sheet A being used, as suggested by the dot-dash lines in Fig. 2.

When the drawing is completed on sheet or leaf A, as shown in Fig. 6, the same may be detached along the scored line J thereof and it will closely simulate a free hand pencil, crayon, charcoal or similar sketch as intended.

It will be clear that each pair of sheets A and B is designed to provide a different picture from its companions. For instance, the pictures may be based on characters famed in nursery rhymes such as that of "Old Mother Hubbard" exemplified by Fig. 6. Attention is called to the fact, that the plurality of fold lines I enable the stop card H to rest flatly between any of the leaves where it is positioned.

Various changes may be resorted to provided they fall within the spirit and scope of the invention.

What is claimed is:

1. In combination, connected severable sheets disposed one over the other, the lowermost sheet initially having incomplete graphic matter thereon, the other sheet having indicia on its upper surface for guidance of a stylus applied thereover to supplement said matter of the first sheet to complete the same through the aid of a transfer medium disposed intermediate the sheets.

2. In combination, connected severable sheets disposed one over the other, the lowermost sheet initially having graphic matter thereon, simulating an incomplete free hand sketch or drawing, the other sheet having indicia on its upper surface dissimilar to the matter necessary to complete the picture for guidance of a stylus applied thereover to graphically produce matter supplementing and completing said matter of the first sheet through the aid of a transfer medium disposed intermediate the sheets.

3. In combination, connected severable sheets disposed one over the other, the lowermost sheet initially having incomplete graphic matter thereon, the other sheet having indicia on its upper surface dissimilar to the matter necessary to complete the picture for guidance of a stylus applied thereover to graphically produce matter supplementing and completing said matter of the first sheet through the aid of a transfer medium disposed intermediate the sheets, said indicia being at consecutively identified locations.

4. In combination, connected severable sheets disposed one over the other, the lowermost sheet initially having incomplete graphic matter thereon, the other sheet having indicia on its upper surface dissimilar to the matter necessary to complete the picture for guidance of a stylus applied thereover to supplement said matter of the first sheet to complete the same through the aid of a transfer medium disposed intermediate the sheets, said indicia being at different zones, each zone having consecutively identified locations.

5. In combination, connected severable sheets disposed one over the other, the lowermost sheet initially having incomplete graphic matter thereon, the other sheet having indicia on its upper surface dissimilar to the matter necessary to complete the picture for guidance of a stylus applied thereover to supplement said matter of the first sheet to complete the same through the aid of a transfer medium disposed intermediate the sheets, said indicia being a series of related dots.

6. In combination, connected severable sheets disposed one over the other, the lowermost sheet initially having incomplete graphic matter thereon, the other sheet having indicia on its upper surface dissimilar to the matter necessary to complete the picture for guidance of a stylus applied thereover to supplement said matter of the first sheet through the aid of a transfer medium disposed intermediate the sheets, said indicia being a series of location-defining media.

7. In combination, connected severable sheets disposed one over the other, the lowermost sheet initially having incomplete graphic matter thereon partially of a picture and, partially of the title of the picture, the other sheet having indicia on its upper surface dissimilar to the matter necessary to complete the picture for guidance of a stylus applied thereover to graphically produce matter supplementing and completing said matter of the first sheet through the aid of a transfer medium disposed intermediate the sheets, said indicia being at different zones, each zone having consecutively identified locations, identifying elements for the separate zones, and a key group of said identifying elements delineated on the upper sheet.

8. In combination, bound severable sheets disposed one over the other, the lowermost sheet initially having graphic matter thereon of an incomplete picture and of an incomplete title for the picture, the other sheet having indicia on its upper surface dissimilar to the matter necessary to complete the picture for guide of a stylus applied thereover whereby to graphically produce matter supplementing and completing said matter of the first sheet through the aid of a transfer medium disposed intermediate the sheets, a cover member having a flap overlapping the sheets at the front with its forward edge constituting a straight edge to aid the severance of the sheets, means binding the flap and sheets together, said cover member including a part normally disposed over the front of the device extending substantially to said forward edge, said part constituting a stop card and being insertable beneath the sheets.

9. In combination, bound severable sheets disposed one over the other, the lowermost sheet initially having graphic matter thereon of an incomplete picture and of an incomplete title for the picture, the other sheet having indicia on its upper surface for guide of a stylus applied thereover to graphically produce matter supplementing and completing said matter on the first named sheet through the aid of a transfer medium disposed intermediate the sheets, said indicia being in different zones, each zone having consecutively identified locations, identifying elements for the separate zones, a key group of said identifying elements being delineated on the upper sheet, a cover member having a flap overlapping the sheets at the front with its forward edge constituting a straight edge to aid the severance of the sheets, means binding the flap and sheets together, said cover member including a part normally disposed over the front of the device extending substantially to said forward edge, said part constituting a stop card and being insertable beneath the sheets, said part having a plurality of relatively close fold lines parallel to said flap for said stop card.

10. In combination; a plurality of sheets disposed one over the other in registration, a lower sheet having incomplete graphic matter thereon, an upper sheet having indicia on its upper surface for guidance of a stylus applied thereover to supplement said matter of the first sheet, to complete the same through the aid of a transfer medium.

11. In combination; an assembly of a plurality of sheets each bearing incomplete graphic matter; said matter on at least one of said sheets serving as a stylus guide; the matter on the individual sheets being such as to not disclose the nature of a complete design; the arrangement of the incomplete graphic matter on the several sheets being such that when the matter on at least one of said sheets is traced by a stylus over an underlying sheet with transfer medium interposed, said tracing in combination with partial drawings carried by said underlying sheet, will reveal a finished drawing.

ELIDORE H. GORTON.